US 6,749,759 B2
Jun. 15, 2004

(54) METHOD FOR DISINFECTING A DENSE FLUID MEDIUM IN A DENSE MEDIUM PLASMA REACTOR (75) Inventors: Ferencz S. Denes, Madison, WI (US); Sorin O. Manolache, Madison, WI (US); Amy C. Lee Wong, Madison, WI (US); Eileen B. Somers, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 161 days.

(21) Appl. No.: 10/194,751

(22) Filed: Jul. 12, 2002

(65) Prior Publication Data

US 2004/0007539 A1 Jan. 15, 2004

(51) Int. Cl.$^7$ ................................................. C02F 1/467
(52) U.S. Cl. ........................ 210/748; 210/764; 422/29; 205/742
(58) Field of Search ................................ 210/748, 764, 210/192, 243; 422/29, 186.21; 205/742, 755, 560

(56) References Cited

U.S. PATENT DOCUMENTS

| | | | |
|---|---|---|---|
| 3,169,914 A | | 2/1965 | Young et al. |
| 3,840,750 A | | 10/1974 | Davis et al. |
| 3,954,954 A | | 5/1976 | Davis et al. |
| 4,016,448 A | | 4/1977 | Nighan et al. |
| 4,915,955 A | | 4/1990 | Gomori |
| 5,234,723 A | | 8/1993 | Babacz |
| 5,368,724 A | * | 11/1994 | Ayers et al. ............... 204/663 |
| 5,437,858 A | | 8/1995 | Hungerbach et al. |
| 5,534,232 A | | 7/1996 | Denes et al. |
| 5,543,133 A | | 8/1996 | Swanson et al. |
| 5,585,020 A | | 12/1996 | Becker et al. |
| 5,655,210 A | * | 8/1997 | Gregoire et al. ............ 422/186 |
| 5,766,447 A | * | 6/1998 | Creijghton ................. 205/742 |
| 5,876,663 A | * | 3/1999 | Laroussi ..................... 422/23 |
| 5,879,715 A | | 3/1999 | Higgins et al. |
| 5,908,539 A | | 6/1999 | Young et al. |
| 6,027,469 A | | 2/2000 | Johnson |
| 6,054,495 A | | 4/2000 | Markowitz et al. |
| 6,096,564 A | | 8/2000 | Denes et al. |
| 6,187,206 B1 | * | 2/2001 | Bernier et al. .............. 210/721 |
| 6,228,266 B1 | * | 5/2001 | Shim ........................ 210/614 |
| 6,264,898 B1 | * | 7/2001 | Ingram .................. 422/186.21 |
| 6,328,898 B1 | * | 12/2001 | Akiyama et al. ........... 210/748 |
| 2002/0074290 A1 | * | 6/2002 | Jensen ....................... 210/668 |

OTHER PUBLICATIONS

Published U.S. application SN 09/880,737, filed Jun. 13, 2001, Publication No. US–2002–0037320–A1, published Mar. 28, 2002.

Akira Mizuno, et al., "Destruction of Living Cells by Pulsed High–Voltage Application," IEEE Trans. on Industrial Applications, vol. 24, No. 3, May/Jun. 1988, pp. 387–394.

Norman F. Marriott, Principles of Food Sanitation (book), Van Nostrand Reinhold, New York, 1989, pp. 106–109.

George J. Banwart, Basic Food Microbiology (book), Van Nostrand Reinhold, New York, 1989, pp. 682, 684, 694, 695.

Masayuki Sato, et al., "Formation of Chemical Species and Their Effects on Microorganisms Using a Pulsed High–Voltage Discharge in Water," IEEE Trans. on Industrial Applications, vol. 32, No. 1, Jan./Feb. 1996, pp. 106–112.

(List continued on next page.)

Primary Examiner—Frank M. Lawrence
(74) Attorney, Agent, or Firm—Foley & Lardner (57) ABSTRACT

A method for disinfecting water and other dense fluid media containing microorganisms is carried out in a dense media plasma reactor. The plasma reaction in the reactor produces reactive species, such as electrons, ions, and free radicals that promote the inactivation of the microorganisms. In various embodiments, the plasma reaction also sputters off minute antimicrobial particles of the electrically conducting material from which the electrodes are made.

27 Claims, 2 Drawing Sheets

OTHER PUBLICATIONS

Sorin Manolache and Ferencz Denes, "Synthesis of Nanoparticles under Cold–Plasma Conditions," Journal of Photopolymer Science and Technology, vol. 13, No. 1, 2000, pp. 51–62, presented at the 17th Conference of photopolymer Science and Technology, Jun. 27–30, 2000, Chiba, Japan.

S. Manolache, E.B. Somers, A.C.L. Wong, V. Shamamian, F. Denes, "Dense Medium Plasma Environments . . . A New Approach for the Disinfection of Water," Environmental Science & Technology, vol. 35, No. 18, Oct. 2001, published on web Aug. 9, 2001.

* cited by examiner

METHOD FOR DISINFECTING A DENSE FLUID MEDIUM IN A DENSE MEDIUM PLASMA REACTOR

REFERENCE TO GOVERNMENT RIGHTS

This invention was made with United States government support awarded by the following agencies: United States Department of Agriculture/Forest Service 99-RCRA-3331. The United States government has certain rights in this invention.

FIELD OF THE INVENTION

The present invention relates to methods for disinfecting water and other dense fluid media in a dense medium plasma environment.

BACKGROUND OF THE INVENTION

Decontamination and disinfection of potable water, water used in food-processing industries, and water frequently in contact with human beings (e.g. water in swimming pools and spa pools), are major health issues currently under intense scrutiny due to heightened awareness. Disinfection is defined as the killing or inactivation of disease-causing organisms. The levels to which microbial colony forming units are permitted in various waters fit for human contact is carefully regulated. Conventional approaches employed for the inactivation of toxins, such as hydrolysis, electrochemical oxidation, solvated electron technology, plasma arcs, and chemical treatments are complex processes with significant limitations related to the generation of toxic side-products or low efficiencies for large scale applications.

Technologies based on atmospheric pressure plasma environments present an alternative approach to the disinfection of water. However, most of the processes available today were developed for low pressure environments, which are plagued by the need for complex and expensive vacuum systems, batch-type processing, and difficult robotics handling. These characteristics make conventional plasma technologies economically viable only for applications where the economies of scale processing are targeted toward the creation of high value-added items.

Gas phase discharges have been studied extensively for their ability to sterilize microorganism-contaminated solid surfaces. However, technologies for decontaminating fluids, and water in particular, are considerably less developed. The destruction of living cells, such as *Saccharomyces cerevisiae* (yeast cells) and *Bacillus natto*, has been studied in pulsed high voltage cylindrical discharge reactors in various electrode configurations. These studies show that yeast cell populations in deionized water can be destroyed using a wire-cylinder electrode configuration under 20 kV/cm, 140 $\mu$s pulse width, and 250 Hz pulse frequency conditions.

The pulsed high-voltage discharge-mediated formation of chemical species and their effects on microorganisms has also been studied. Using a needle-plate electrode configuration, the formation of .OH and .H free radicals has been monitored by Optical Emission Spectroscopy. The studies indicated that .OH and .H free radicals generated in situ by a discharge were not effective at killing yeast cells, although the $H_2O_2$ generated by the discharge added ex situ to a contaminated sample could be used to kill the cells.

Unfortunately, these pulse discharge experiments for decontaminating water employed a high voltage, pulsed discharge which generated filamentary non-stationary discharge channels, resulting in reactions having a very localized character, which tends to limit the effectiveness of the reactions for inactivating microorganisms.

Another approach to the disinfection of microorganism-contaminated water employs antimicrobial nanoparticles. Nanoparticles are important components in the development of catalytic, sensor, aerosol, filter, biomedical, magnetic, dielectric, optical, electronic, structural, ceramic and metallurgical applications. Nanoscale metallic particles exhibit volume and surface effects which are absent in the same material with dimensions in the micron range (i.e., 0.1 micron<particle diameter<1 micron).

The use of colloidal suspensions of silver as antimicrobial agents is well known. Such use is resuming increased importance as antibiotic resistant bacteria become more prolific. Minimizing the silver particle sizes is believed to be important both from the stability of the colloidal suspension and for the efficacy against microbes.

Various processes to produce nanoparticles are known in the prior art. For example, U.S. Pat. No. 5,543,133, issued to Swanson et al., discloses a process of preparing nanoparticulate agents comprising the steps of: (i) preparing a premix of the agent and a surface modifier; and, (ii) subjecting the premix to mechanical means to reduce the particle size of the agent, the mechanical means producing shear, impact, cavitation and attrition.

Likewise, U.S. Pat. No. 5,585,020, issued to Becker et al., teaches a process of producing nanoparticles having a narrow size distribution by exposing microparticles to an energy beam such as a beam of laser light, above the ablation threshold of the microparticles.

Also, U.S. Pat. No. 5,879,750, issued to Higgins et al., teaches a process for producing inorganic nanoparticles by precipitating the inorganic nanoparticles by a precipitating agent for a microemulsion with a continuous and a non-continuous phase and concentrating the precipitated nanoparticles employing an ultrafiltration membrane.

Additionally, U.S. Pat. No. 6,540,495, issued to Markowicz et al., teaches a process for making a powder containing metallic particles comprising the steps of: (i) forming a dispersion of surfactant vesicles in the presence of catalytic metal ions; (ii) adjusting the pH to between 5.0 and 7.0; (iii) mixing the dispersion with a bath containing second metal ions; and; and, (iv) incubating the mixed dispersion at a temperature sufficient to reduce the second metal ions to metal particles having an average diameter between 1 to 100 nm.

CS Pro Systems advertises a high voltage AC processor producing nanoparticles of colloidal silver. The HVAC process is claimed to produce particle sizes between 0.002 to 0.007–9 microns by imposing an AC potential of 10,000 volts across two silver electrodes in a distilled water medium.

The production of large quantities of colloidal silver solutions required for industrial applications, such as water treatment or treatment of biological fluids, are not economical by using the electrolytic approach.

The prior art methods do not provide simple, convenient, low-cost methods for disinfecting water, and other dense media, contaminated with undesirable microorganisms.

SUMMARY OF THE INVENTION

One aspect of the invention provides a method for disinfecting a dense fluid medium, such as water, containing at least one undesirable microorganism. The method uses multiple spark discharges to inactivate the microorganisms in an intensely stirred liquid medium. The method comprises the steps of: providing a reaction vessel for containing a dense fluid medium containing at least one microorganism; charging the dense fluid medium into the reaction vessel; providing a first electrode comprising a first conductive material, the first electrode immersed within the dense fluid medium; providing a second electrode comprising a second conductive material, the second electrode immersed within the dense fluid medium and disposed opposite the first electrode; stirring the dense fluid medium between the first and second electrodes; applying an electric potential between the first electrode and the second electrode to create a discharge zone comprising a plurality of discharges to produce reactive species in the dense fluid medium; and exposing the microorganisms in the dense fluid medium to the reactive species in the dense fluid medium for a time sufficient to at least partially inactivate the microorganisms. The reactive species include electrons, ions, free radicals, and mixtures thereof which are capable of interacting with the microorganism to promote the inactivation of the microorganism. In a preferred embodiment, the first electrode is a rotating electrode and the second electrode is a static electrode. In this embodiment the dense fluid medium is stirred by the rotating motion of the first electrode.

Another aspect of the invention provides a method for disinfecting a dense fluid medium containing at least one microorganism using antimicrobial colloidal nanoparticles generated in a dense medium plasma (DMP) environment through multiple spark discharges in an intensely stirred liquid medium. The steps in this method are substantially the same as those described above, however, in this aspect of the invention at least one of the first conductive material or the second conductive material comprise a material having antimicrobial properties and the electric potential between the first electrode and the second electrode is sufficient to dislodge or dislocate antimicrobial nanoparticles from that material. A particularly preferred material having antimicrobial properties is silver.

Yet another aspect of the invention provides a two-step method for disinfecting a dense fluid medium containing at least one undesirable microorganism. In the first step of the two step method the dense fluid medium containing the at least one microorganism is exposed to reactive species created by multiple spark discharges in an intensely stirred medium. The reactive species are allowed to react with the microorganism to at least partially inactive the microorganism. The method for carrying out this first step has been described above. Briefly, a dense fluid medium containing at least one microorganism is disposed between two electrodes. The medium is stirred between the electrodes and an electric field sufficient to produce multiple spark discharges is applied between the electrodes to produce reactive species that interact with the at least one microorganism to promote its inactivation. In the second step of the two step method, the dense fluid medium containing the at least one microorganism is exposed to antimicrobial colloidal nanoparticles.

The second step of the process may be accomplished by mechanically mixing a solution containing antimicrobial nanoparticles, which may be a colloidal suspension, into the dense fluid medium. Such a solution may be produced by conventional means well known in the art or may be produced using a dense medium plasma reactor, as described in greater detail below. The mixing may take place before, during, or after the dense fluid medium has been exposed to the reactive species created by the multiple spark discharges in the first step of the process. Alternatively, the antimicrobial nanoparticles can be formed within the dense fluid medium by exposing the dense fluid medium to multiple spark discharges between a first and a second electrode, at least one of which is comprised of a material having antimicrobial properties.

In the two-step method, the first step and the second step may take place simultaneously or in tandem. For example, where at least one of the first or second electrodes is made from a material having antimicrobial properties and the voltage between the first and the second electrodes is high enough to dislocate antimicrobial nanoparticles from that electrode, reactive species and antimicrobial nanoparticles will be formed simultaneously in the same reaction vessel. Alternatively, the two step process may be carried out in a dual-stage dense medium plasma reactor having separate reaction stages, or containers, housed within a single reaction vessel which may be connected in parallel or, preferably, in series, to facilitate continuous production of the colloidal dispersion.

When carried out in a dual-stage dense plasma reactor, the method includes the steps of: providing a first reaction container for containing a dense fluid medium containing at least one microorganism; charging the dense fluid medium into the first reaction container, providing a first electrode comprising a first conductive material, the first electrode immersed within the dense fluid medium and housed within the first reaction container; providing a second electrode comprising a second conductive material, the second electrode immersed within the dense fluid medium and disposed opposite the first electrode within the first reaction container; applying an electric potential between the first electrode and the second electrode to create a discharge zone comprising a plurality of discharges, wherein the electric potential between the first and the second electrodes is high enough to produce reactive species in the dense fluid medium; providing a second reaction container for containing a dense fluid medium containing at least one microorganism the second reaction container connected to and in fluid communication with the first reaction container through an inlet port; charging the dense fluid medium between the first reaction container and the second reaction container; providing a third electrode comprising a third conductive material, the third electrode immersed within the dense fluid medium and housed within the second reaction container; providing a fourth electrode comprising a fourth conductive material, the fourth electrode immersed within the dense fluid medium and disposed opposite the third electrode within the second reaction container; applying an electric potential between the third electrode and the fourth electrode to create a discharge zone, wherein at least one of the third conductive material or the fourth conductive material comprises a material having antimicrobial properties; and further wherein the electric potential between the third and the fourth electrodes is high enough to dislocate antimicrobial nanoparticles from the electrode comprising the material having antimicrobial properties.

It should be understood that in the two-step process described above, the flow of the dense fluid medium may be from the first container (i.e. the container wherein reactive species are created) to the second container (i.e. the container wherein the antimicrobial species are created) or vice versa. Thus the phrase "charging the dense fluid medium between the first reaction container and the second reaction container" does not limit the flow of the dense fluid medium to one direction or the other, but merely indicates that the fluid is moving or circulating between the containers.

Still another aspect of the invention provides a method for producing a colloidal dispersion of nanoparticles of at least one conductive material in a dense fluid medium. The production of nanoparticles, and in particular antimicrobial nanoparticles, in this manner is well-suited for use with applications for disinfecting water, and other dense fluid media, contaminated with microorganisms. The method is based on the operation of a modified dense medium plasma reactor, which allows the initiation of multiple spark discharges in a very intensely stirred liquid medium. The method comprises the steps of: providing a reaction vessel for containing the dense fluid medium; charging the dense fluid medium into the reaction vessel; providing a first electrode comprising a first conductive material, the first electrode immersed within the dense fluid medium; providing a second electrode comprising a second conductive material, the second electrode immersed within the dense fluid medium and being near to the first electrode; stirring the dense fluid medium between the first and second electrodes; and imposing an electric potential between the first electrode and the second electrode to create a discharge zone, the electric field between the electrodes being sufficiently high to dislocate nanoparticles of at least one of the first conductive material or second conductive material from the respective electrode. Preferably, the electrodes are easily interchanged to facilitate changeover between dispersions. In a preferred embodiment, the first electrode is a rotating electrode and the second electrode is a static electrode. In this embodiment the dense fluid medium is stirred by the rotating motion of the first electrode.

An exemplary dense phase plasma discharge apparatus suitable for use with the invention may include a chamber forming a reaction vessel for the dense medium. A first electrode is mounted for a rotation about an axis in the chamber and has an end piece which is formed of conductive material with a planar surface. A plurality of pins are mounted in an array projecting from the planar surface. A second electrode is mounted in the chamber and has an end piece of conductive material with a planar surface, with the planar surfaces of the end pieces of the first and second electrodes separated from each other by a gap. The end pieces of the first and second electrodes, including the pins on the one end piece, may be formed of silver for efficiently producing colloidal silver. A motor may be coupled to the first electrode to selectively drive the first electrode in rotation. A magnetic coupling system may be utilized to couple the drive from the motor to the rotating electrode. The pins in the electrode are preferably formed in a spiral array. Rapid rotation of the electrode with the pins therein creates vigorous mixing and cavitation of the dense medium, such as water, between the upper and lower electrodes to enhance the action of the discharges taking place between the electrodes and thereby enhance the production of nanoparticles dislodged from the electrodes from the discharge.

Utilization of the method of the invention with silver electrodes may be used to produce colloidal silver which is highly effective as a bactericide and can be used for controlling viruses, spores, and other undesirable microorganisms.

Further objects, features and advantages of the invention will be apparent from the following detailed description when taken in conjunction with the accompanying drawings.

DETAILED DESCRIPTION OF THE PRESENT INVENTION

As used herein, the term "nanoparticle" refers to particles having an average diameter of less than about 100 nm, preferably less than about 50 nm, more preferably less than about 20 nm, most preferably less than about 10 nm.

As used herein, the terms "electrically conducting material," "conductive material" or "conductor" are interchangeable and refer to a class of bodies incapable of supporting electric strain such that a charge given to a conductor spreads to all parts of the body of the conductor.

The term "dense medium" refers to materials that are liquid at the operating conditions in the plasma reactor.

The term "antimicrobial nanoparticle" refers to nanoparticles that play a role in the inactivation of microorganisms. The nanoparticles may be capable of reacting directly with the microorganisms to promote the inactivation of the microorganisms, or they may act as catalysts or photocatalysts for reactions between other reactive species and the microorganisms.

The term "plasma" is used to identify gaseous complexes which may comprise electrons, positive or negative ions, gaseous atoms and molecules in the ground state or any higher state of excitation including light quanta. The most common method for achieving a plasma state is through an electrical discharge. Electrical discharge plasmas are either "hot," i.e., thermal, or "cold," i.e., nonthermal.

"Hot" (thermal plasma) plasmas comprise gas atoms and electrons which are essentially close to thermal equilibrium with each other. "Hot" plasmas are produced from electrical arcs, plasma jets, and magnetic fields. "Hot" plasmas produced from electrical arcs and plasma jets require equilibrium conditions in which the gas and electron temperatures are very high ($5 \times 10^3$K) and nearly identical. As a result, most organic molecules and polymers cannot be treated under these conditions because they would be rapidly degraded.

There are also several disadvantages associated with hot plasma synthesis. One main disadvantage is the presence of elevated temperatures of the gas phase and substrate. The elevated temperature requirement limits plasma synthesis to organic reactions, limits high molecular weight depositions, and creates a requirement for costly handling equipment due to the high temperatures generated. Other disadvantages include the predominance of decomposition reactions and the production of non-recyclable gas compositions generated from undesired secondary gas phase recombination reactions.

"Cold" plasmas, which are not at thermal equilibrium, comprise gas atoms at room temperature and electrons at much higher temperatures. This plasma state provides an ambient gas temperature along with electrons which have sufficient kinetic energy to cause the cleavage of chemical bonds. As a result, "cold" plasmas are highly suitable for chemical reactions, such as organic synthesis, polymerizations, surface treatments, and grafting reactions, which involve thermally sensitive materials. "Cold" plasmas are characterized by average electron energies of 1–20 electron Volts and electron densities of $10^9$ to $10^{12}$ cm$^{-3}$. There are two types of "cold" plasmas: 1) the low pressure glow types which are produced by alternating current, direct current, or radio frequency discharges; and 2) the high pressure corona type and barrier discharges produced at electrodes during a high-voltage discharge.

The inventors have found that water, and other dense fluid media, contaminated with undesirable microorganisms can be disinfected by exposing the dense and intensely stirred fluid medium to a plasma reaction between two electrodes comprising electrically conductive materials. Moreover, the inventors have discovered that the disinfection is optimized when the fluid medium contains antimicrobial nanoparticles.

In this method, two electrodes comprising conductive materials are submerged in a dense fluid that is contaminated with at least one microorganism and the dense fluid is stirred vigorously between the electrodes. An electric potential is applied between the two electrodes to produce multiple plasma discharges. The microorganisms in the dense fluid are inactivated by the exposure to the discharges and the reactive species created by the discharges. Optionally, the microorganisms may also be exposed to antimicrobial nanoparticles. These nanoparticles may be mechanically mixed into the dense fluid medium or they may be produced in the medium itself if at least one of the two electrodes comprises a material having antimicrobial properties and the electric potential applied across the electrodes is sufficiently high to dislocate nanoparticles from the at least one electrode comprising a antimicrobial material. The method may also be carried out in two steps wherein the dense medium containing the microorganisms is exposed to multiple plasma discharges and the reactive species that are created by those discharges in a first step, and exposed to antimicrobial nanoparticles in a second step. The two steps preferably take place in separate reaction containers that are connected either in series or in parallel in a single reaction vessel, such that the dense fluid medium may be circulated from one container to the other. Similarly, the process may take place in a multistage systems having three or more reaction containers connected in series or parallel, each of which may contain two electrodes comprising materials chosen for their specific conductive or antimicrobial properties.

Without wishing to be bound to any particular theory, the inventors believe that the inactivation of the microorganisms is due, at least in part, to the interaction between the microorganisms and reactive species created by the discharge, such as electrons, ions, and free radicals, including .O, .OH, and .OOH radicals. In addition, the inactivation may be promoted by the physical effects of the discharge itself on the microorganisms, for example, the application of an electric field or shock waves created by a discharge may cause cell membranes to breakdown. When antimicrobial nanoparticles are present in the dense medium, the inactivation is further promoted by the interaction or reaction between the particles and the microorganisms.

The methods according to the present invention are particularly well suited for the disinfection of dense fluids containing bacteria, and more specifically bacteria in the form of spores. Certain bacteria can exist both in the vegetative state and as spores. Spores are dormant states that bacteria assume during nutritionally unfavorable conditions. Spores are widespread in nature because they can survive for long periods and can be dispersed readily by water, wind, and hosts such as animals and insects. In the dormant state, spores undergo no detectable metabolism and exhibit a higher degree of resistance to inactivation by wet and dry heat, freezing, ultraviolet and gamma radiation, extreme desiccation, and oxidizing agents. As a result, harsher processes are required to inactivate spores in food and water in comparison to vegetative microorganisms.

It is suggested that the longevity of spores is related to their capacity to protect their critical cellular components from damage and to repair or replace damaged components during germination. This incredible viability can be attributed to the specific structures, characteristics and reaction mechanisms associated with the genetic makeup of sporulating species, including spore coat and coat structure.

The protection of the nucleoid of a spore by a multilayer coat, cortex, and a low permeability core make access difficult for germicidal agents and other wet chemical disinfection agents. To circumvent this problem, conventional techniques have employed strong penetrating electromagnetic radiation, including ultraviolet and gamma radiation, to break down the spore's protective shell prior to attack by inactivating chemicals. The inventors believe that the present invention overcomes the difficulties of spore inactivation by using a multistage attack wherein plasma discharges are used to physically breakdown the protective outer layers of the spore while reactive species, and optionally, antimicrobial nanoparticles are used to attack the critical cellular components of the spore.

The inventors have also found that colloidal suspensions of antimicrobial nanoparticles of electrically conductive materials can be produced by generating a plasma reaction between two electrodes, comprising the desired electrically conductive material(s), which are immersed within a dense fluid medium. Preferably, the dense medium is rapidly recirculated between the two electrodes.

The colloidal nanoparticle dispersion is produced by fine sputtering particles of the electrically conducting material from the electrodes, by the multitudes of (DC or AC) discharges initiated and sustained between the rotating and the stationary electrodes, into the intensely stirred dense medium, which is preferably water.

Advantageously, the electrodes can comprise any desired electrically conductive material. Typically, electrically conducting materials usable in this invention include metals, carbon or combinations thereof. Specific examples of suitable metals include aluminum, antimony, bismuth, copper, gold, iron, lead, molybdenum, nickel, platinum, silver, tin, tungsten, zinc or the rare earths (group IIIB (lanthanide series) of the periodic table as published in *Hawley's Condensed Chemical Dictionary*, $12^{th}$ ed., front cover), such as titanium. Combinations or alloys of the conductive materials, such as stainless steel, are encompassed within the scope of the current invention. In various embodiments the conductive material is substantially pure. "Substantially pure" means that the resulting nanoparticles have sufficient purity for the desired use. In these embodiments, the electrically conducting material should be at least about 90, preferably at least about 95, more preferably at least about 99 percent pure.

In embodiments wherein the plasma discharge system is to be used to produce antimicrobial nanoparticles within the dense fluid medium during the disinfection process, the electrodes are made from a metal having antimicrobial properties. Silver electrodes are particularly well-suited for this application, as it is well-known that silver nanoparticles possess bactericidal properties.

In embodiments wherein disinfection of a dense fluid medium is conducted in multiple steps including the step of exposing the dense fluid medium to reactive species created by multiple spark discharges and the step of exposing the dense fluid medium to antimicrobial nanoparticles created by multiple spark discharges, the electrodes used to carry out each step should be selected according to their ability to produce reactive species and antimicrobial nanoparticles, respectively. Electrode materials that are well suited for use in inactivating microorganisms through the production of reactive species include iron, titanium, and stainless steel. Electrode materials that are well suited for use in inactivating microorganisms through the production of antimicrobial nanoparticles include silver.

Preferably, the electrodes are constructed of an electrically conducting material which is substantially inert to the dense medium. "Substantially inert" means that the electrically conducting material does not react with or dissolve at undesirably high rates under the conditions present during the plasma reaction. If desired, the electrodes may be made from different materials in order to produce a colloidal suspension of more than one electrically conducting material.

Preferably, the electrodes are constructed so as to be easily removed and installed. This easy interchangeability facilitates replacing worn electrodes or changing electrodes to accommodate the production of different colloidal dispersions.

The dense fluid medium may be any liquid having a viscosity low enough to permit rapid circulation of the fluid between the two electrodes. The present invention has important implications in the field of water disinfection, and therefore the dense medium will typically be water. However, the invention may also be used disinfect other microorganism-contaminated fluids where desirable.

The plasma reaction will decompose the molecules of the dense medium into highly reactive free radicals. As such, the reaction products formed from the dense medium free radicals may be final reaction products or undesirable contaminants to the colloidal solution. An undesirable by-product is any compound that must be removed, due to technical, practical or aesthetic reasons, from the colloidal dispersion prior to use. In most cases, when inorganic/organic hybrid nanoparticle systems are prepared, liquid phase organometallic compounds can be used. In a preferred embodiment, the conductive materials of the electrodes, the dense fluid medium, and the plasma reactor parameters (i.e., voltage, current, angular speed of any rotating electrode, and gas flow rate) can be selected such that metallic, metal-oxide- and inorganic/organic hybrid-nanoparticles are produced simultaneously in a controlled manner. The dense medium can be typically selected to avoid the production of undesirable by-products. In the preferred embodiment, the decomposition reaction products of water ($H^+$ and $OH^-$) readily react with each other to reform the water molecule. In contrast, the decomposition reaction products of other dense media, e.g. benzene, are free radicals which may initiate polymerization reactions.

When sole (non-hybrid) nanoparticle systems are required, the plasma should not generate byproducts from dense medium. Preferably, any reaction between the dense medium and the electrically conductive material is slow enough that the nanoparticles in the colloidal dispersion have the desired shelf-life. Most preferably, the dense medium, and any minute quantity of by-product, is non-reactive with the electrically conducting material. "Non-reactive" means that the dense medium and the nanoparticle material do not combine to form a new compound under the operating conditions of the plasma reactor. Examples of usable dense medium liquids include organic solvents, silicon tetrachloride, isobutylene, etc. (in applications where by-products are not undesirable), and water, preferably water.

The electrodes and the dense fluid medium are located within any suitable containment means. The containment means may be open or closed, preferably closed, more preferably a closed pressure vessel. The containment means optionally has means, such as a vacuum pump, to evacuate the containment means. Preferably, the containment means may be pressurized, more preferably pressurized by charging the containment means with an overpressure of inert gas. Preferably, the containment means has means, such as ports, valve, pumps, etc., to charge and discharge the dense medium. The dimensions of the containment means should be sufficient to prevent loss of the dense medium or colloidal dispersion and to provide the volume required for the volume of the dense medium and electrodes. Preferably, the containment means has a size and shape to accommodate the desired batch size/throughput rate of the dense medium such that the desired circulation pattern of the dense medium may be obtained without dead spots.

Several containment means may be connected in parallel or, preferably, in series, to facilitate continuous production of the colloidal dispersion or to facilitate a multistage disinfection process, as described above. The containment means may be connected through ports such that the output port of one containment means is connected to the input port of another containment means, allowing the dense fluid to circulate between the containment means. Optionally, valves and pumps may be employed to help circulate the dense fluid and to charge and discharge the fluid from each containment means.

Figure 1:
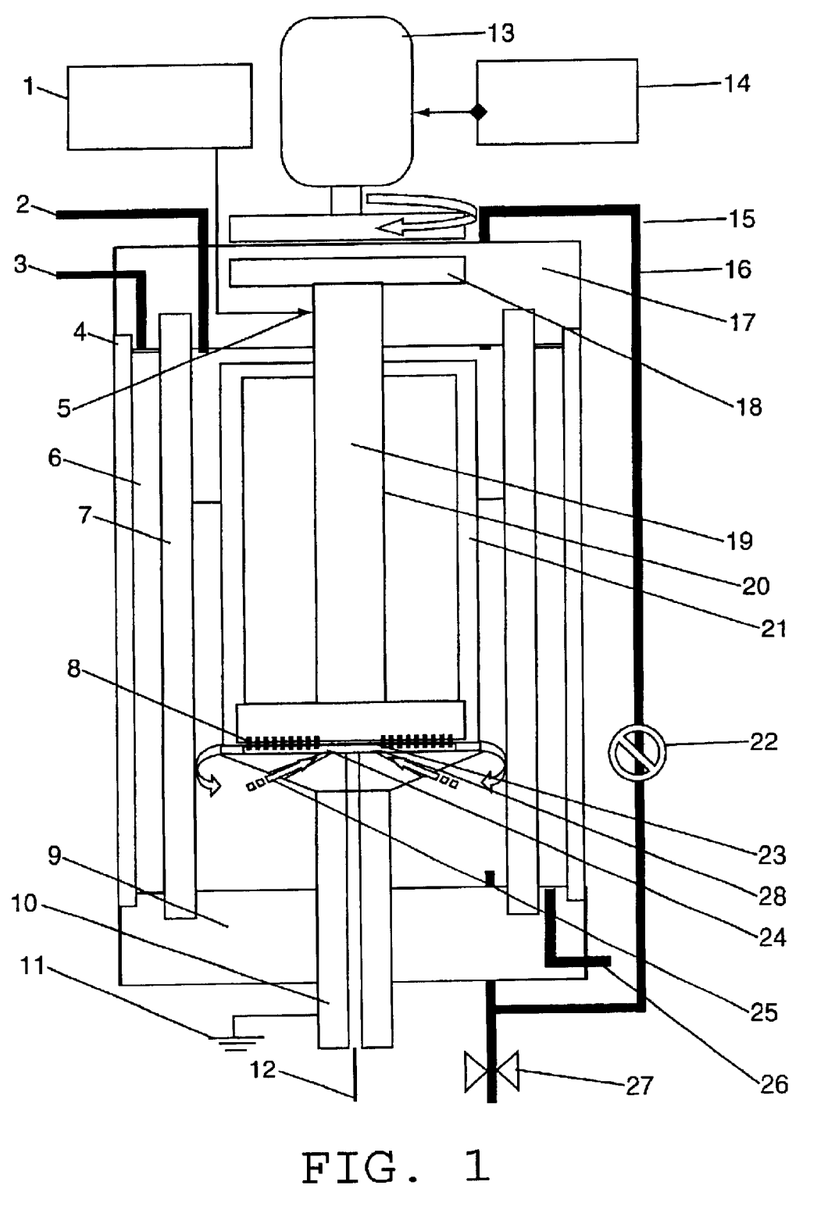
FIG. 1 shows a schematic representation of a dense medium plasma reactor suitable for use in this invention.

The methods of disinfecting dense fluid media and producing colloidal dispersions according to this invention are conveniently produced in dense medium plasma reactors. An example of such a reactor is disclosed in U.S. Pat. No. 5,534,232 which is incorporated herein by reference. Another example of such a dense medium plasma reactor is shown in FIG. 1. However, one skilled in the art will recognize that any dense medium plasma reactor which comprises at least two electrodes, means for rapidly recirculating the dense medium between the two electrodes and, optionally, means to provide bubbles within the dense medium circulating between the electrodes is suitable for use in this invention.

A preferred apparatus for disinfecting a dense medium and producing colloidal nanoparticles in a dense medium is illustrated generally in FIG. 1. The apparatus of FIG. 1 includes a DC power supply 1, an evacuation tube 2 for gasses, a coolant exit tube 3 and an inlet tube 26, outer and inner glass cylinders 4 and 7 which form part of the chamber for the reaction vessel, an electrical brush contactor 5, and coolant 6 which is enclosed within the volume defined between the outer glass cylinder 4 and the inner glass cylinder 7. An upper electrode may include an end piece 8 having an array of conductive pins 23 in a ceramic holder. The chamber of the reaction vessel is further enclosed by a lower end cap 9 and an upper end cap 17 which are engaged with the glass cylinders 4 and 7 to form an enclosed space for the coolant 6 and an inner chamber defining the reaction vessel. The lower electrode 10 is a non-rotating electrode and is mounted with its end piece adjacent to the end piece of the upper electrode. The lower electrode 10 is electrically connected to a ground 11. A gas inlet tube 12 formed through the lower electrode allows introduction of gas through the electrode into the gas space between the planar faces of the end pieces of the upper and lower electrodes. A motor 13, e.g., an electric motor, hydraulic motor, etc. is controlled by a controller 14 (e.g., digital motor controller) and is coupled via magnetic couplers 15 and 18, which form a magnetic coupling system to the rotating upper electrode 19. The electrode 19 is conductive to conduct power from the power supply 1, as transferred thereto by the brush 5, to the electrically conductive end piece 8 and the pins mounted thereon. The dense medium is supplied to the reaction vessel through an inlet tube 16. A quartz enclosure 21 is mounted to the upper electrode as an isolator to isolate the conductive shaft 19 of the upper electrode within an enclosed space 20 and seal it off from the liquid medium within the reaction vessel. A recirculating pump 22 is connected to the inlet tube 16 to drive recirculation of the liquid medium from the bottom of the chamber of the reaction vessel to the top. The pins 23 are mounted in the planar surface of the end piece 8 of the upper electrode and, preferably in a spiral pattern array as discussed further below, and are formed of an electrically conductive material such that electrical discharges (shown for illustration at 24 in FIG. 1) occur between the pins and the adjacent planar surface of the end piece of the lower electrode. Channels or conduits 25 are formed in the end piece of the lower electrode to allow recirculation of fluid through the end piece into the space between the upper and lower electrodes. A valve 27 is connected to the supply line 16 to allow discharge of the fluid medium within the chamber after treatment has been completed.

As noted above, the reactor of FIG. 1 is composed of a cylindrical glass chamber 7, which functions as the reaction vessel, provided with two, stainless steel, upper and bottom caps 9, 17, and a cooling jacket 4. The rotating, cylindrical stainless steel, upper electrode 19 is equipped with the quartz jacket 21 for avoiding the penetration of the reaction media to the electrode sustaining central shaft and bearings. The upper electrode has a cylindrically-shaped, disc cross-section end piece, which is terminated in an interchangeable ceramic pin-array holder 8 for the pins 23. Preferably, the pins are spirally located in the pin-array. As used herein, "pin" refers to any type or shape of protuberance extending from the face of the end piece of the electrode. The lower electrode is hollow, and has also an interchangeable conical cross-section end piece, and in addition it is provided with channels 25 for the recirculation of the reaction media. Both the pin-array and the interchangeable metallic part of the lower electrode may be made of various conductive materials, including pure silver. The distance between the pin-array and the lower electrode can conveniently be modified by a micrometric (thimble) screw-system. A typical gap distance is at least about 0.2, preferably at least about 0.5 mm, up to about 3, preferably up to about 1 mm. The distance is selected according to the dielectric constant of the liquid medium. The reactor is vacuum-tight and the rotation of the upper electrode is assured through a magnetic coupling system 15, 18 that couples a motor 13 (e.g., an electric motor, hydraulic motor, etc.) to the upper electrode 19 to selectively drive it in rotation. The reactor can be operated in batch-type or continuous-flow modes, depending on the specific application. Reactive or inert gases can also be introduced into the dense medium during the plasma processes through the hollow lower electrode. These gases provide bubbles within the planar gap between the electrodes, thereby facilitating the plasma reaction. The rotation of the upper electrode is digitally controllable in the range of 0–5,000 rpm. The rotation of the upper electrode causes further bubble formation through cavitation of the liquid medium. The bubble formation (cavitation) is very important to the efficiency of the dense medium reactor in that the bubbles render a volume-reaction (i.e., the reaction occurs within the volume of the bubble) rather than an interphase reaction between the plasma-generated species and the microorganisms.

The contaminated dense fluid media are disinfected as follows. References are to FIG. 1.

First, the reaction vessel 7 of the dense medium plasma reactor is optionally cooled by recirculating cooling agents 6 such as gas or liquid nitrogen, or cooled alcohol, through the mantle area located between the glass cylinders 4 and 7 of the double-walled reaction vessel. Next, the reaction vessel 7 is charged with a dense fluid medium containing at least one microorganism. Upon charging the reaction vessel 7, a positive supply of gas is introduced into the reaction vessel 7 through the lower port 12 contained in the lower static electrode 10. The gas may be various inert gases, one example of which is argon, or reactive gases, examples of which are oxygen, ammonia and $CF_4$. Many other gases may be used depending on the desired reactions between the electrodes. The gas travels through the lower hollow shaft of the lower static electrode 10, through the small central opening located at the upper end of the lower static electrode 10, and then through the dense medium. The gas then forms a gas blanket over the dense medium. The gas blanket may be vented to the atmosphere to accommodate the positive supply of gas that is being introduced through the lower static electrode 10, thereby maintaining the system at the desired pressure, preferably atmospheric pressure. Higher pressure conditions combined with low temperatures can also be used for more volatile dense media such as silicon tetrachloride and isobutylene.

Once the system has achieved low temperature and atmospheric pressure conditions, the upper rotatable electrode 19 is rotated at a high speed, e.g., at least about 50, preferably at least about 500, more preferably at least about 1000 up to about 5,000, preferably up to about 2000 rpm, which results in the recirculation 25 of the dense medium. A direct electric current is then established between the upper planar electrode face of the upper rotatable electrode 19 and the lower planar electrode face of the lower static electrode 10. The direct electric current ignites the plasma reaction. More importantly for this invention the direct electric current, coupled with the rotation of the upper electrode, produces multiple electric pulses. These electric pulses provide the energy to generate reactive species such as electrons, ions, and free radicals, and to sputter off small particles of the conductive material from the electrodes. The sputtered particles initially may have an electric charge but are believed to rapidly lose that charge to surrounding materials.

The intense stirring of the dense fluid within the plasma reactor concentrates the electric field, and allows the generation of multiple discharges at low voltage and current value. Preferably, the voltage applied across the electrode faces is in the range of 100 to 800 Volts, more preferably about 100 to about 250, most preferably about 200 V. The higher voltage peaks (e.g., 250–300 V) applied to the electrodes at the starting point (i.e., the first moment of voltage application) decrease to 100–250 V during the reaction, which is determined by the conductivity of newly synthesized compounds, and the DC current stabilizes between the limits of 0.1–4 Amps. This results in a power range of 10–1000 Watts. By establishing a low electric current to the electrode faces and rapidly rotating the upper planar electrode face relative to the lower planar electrode face without touching the stationary lower planar electrode face, the electric discharge or discharges are initiated in different locations of the plasma zone, i.e. different locations within the planar gap, thereby eluding the creation of local caloric energy concentrations. As a result, the reaction mechanisms produced from the inventive method and apparatus for forming nanoparticles of conducting particles are controlled by electron flux intensity rather than thermal energy.

The dense medium is preferably circulated between the upper and lower planar electrode faces because the formation of reactive species and sputtering only occur in the planar gap located between the electrode faces. The circulation of the dense medium results from the centrifugal force created by the rotation of the upper planar electrode face relative to the lower planar electrode face. This centrifugal force causes the dense medium located between the electrode faces to move radially outward (away from electrode faces). The radial outward movement of the dense medium creates vacuum and cavitation effects which draw more dense medium from within the reaction vessel 7 in the direction of arrows 25 through a plurality of ports 28 located in the lower static electrode 10, into the hollow shaft of the electrode 10, and through the openings of the lower static electrode 10 to the planar gap located between the electrode faces.

The rotation of the upper rotatable electrode 19 also aids in circulating the dense medium contained within the reaction vessel 7. The same centrifugal force created by rotating the upper planar electrode face in relation to the lower planar electrode face causes some of the dense medium located in the planar gap between the electrode faces to gravitate into the lower portion of the reaction vessel 7. This gravitation of the dense medium subsequently forces the dense medium to recirculate from a lower site within the reaction vessel 7 to an upper site within the reaction vessel 7 via the reactant recirculation line 16 and peristaltic pump 22 which comprises part of the dense medium plasma reactor. In summary, the centrifugal force created by rotating the upper rotatable electrode 19 induces a very intense movement and mixing of the dense medium.

The rotation of the upper rotatable electrode 19 permits the fast removal of active species from the plasma zone, i.e., that area which constitutes the planar gap located between the electrode faces, thereby inhibiting the development of extensive decomposition reactions. The rapid circulation also removes the nanoparticles from the area between the electrodes thereby decreasing the possibility of the nanoparticles reattaching to the electrodes. In addition, the rotation of the upper rotatable electrode 19 aids in the achievement of a caloric energy equilibrium of the dense medium.

The dense fluid medium may be discharged from the dense medium plasma reactor by any convenient means. For example, for batch dense medium reactors, a drain port and valve may be located on the bottom of the reaction vessel 7 to allow the dense fluid medium to be drained into any convenient collection vessel. In another example, for a continuous dense medium plasma reactor, the discharge port may be located on the upper surface of reaction vessel 7 and the dense fluid medium removed as overflow from the reactor vessel.

The temperature of the system and, therefore, the temperature of the material contained within the reaction vessel 7, may be monitored and controlled by a thermostat.

The methods for disinfecting a dense fluid medium or producing nanoparticles of electrically conducting materials by means of an induced plasma state may also be carried out as a continuous flow-system reaction. This can be achieved by selecting the proper residence times of dense media in the reactor and employing circulation means, e.g., a peristaltic pump, to circulate the dense medium in and out of the reaction vessel via input and output lines which are connected to the reaction vessel.

The continuous method for producing nanoparticles of electrically conducting materials may also be carried out in a multistage plasma reactor. Such a multistage plasma reactor comprises multiple dense medium plasma reactors each housed in a separate reaction container with a single reaction vessel, connected either in series or parallel, preferably in series. In the preferred series multistage reactor, the output of the upstream reactors is connected to the input of the downstream reactors. An example of such a multistage reactor is shown in FIG. 2.

Figure 2:
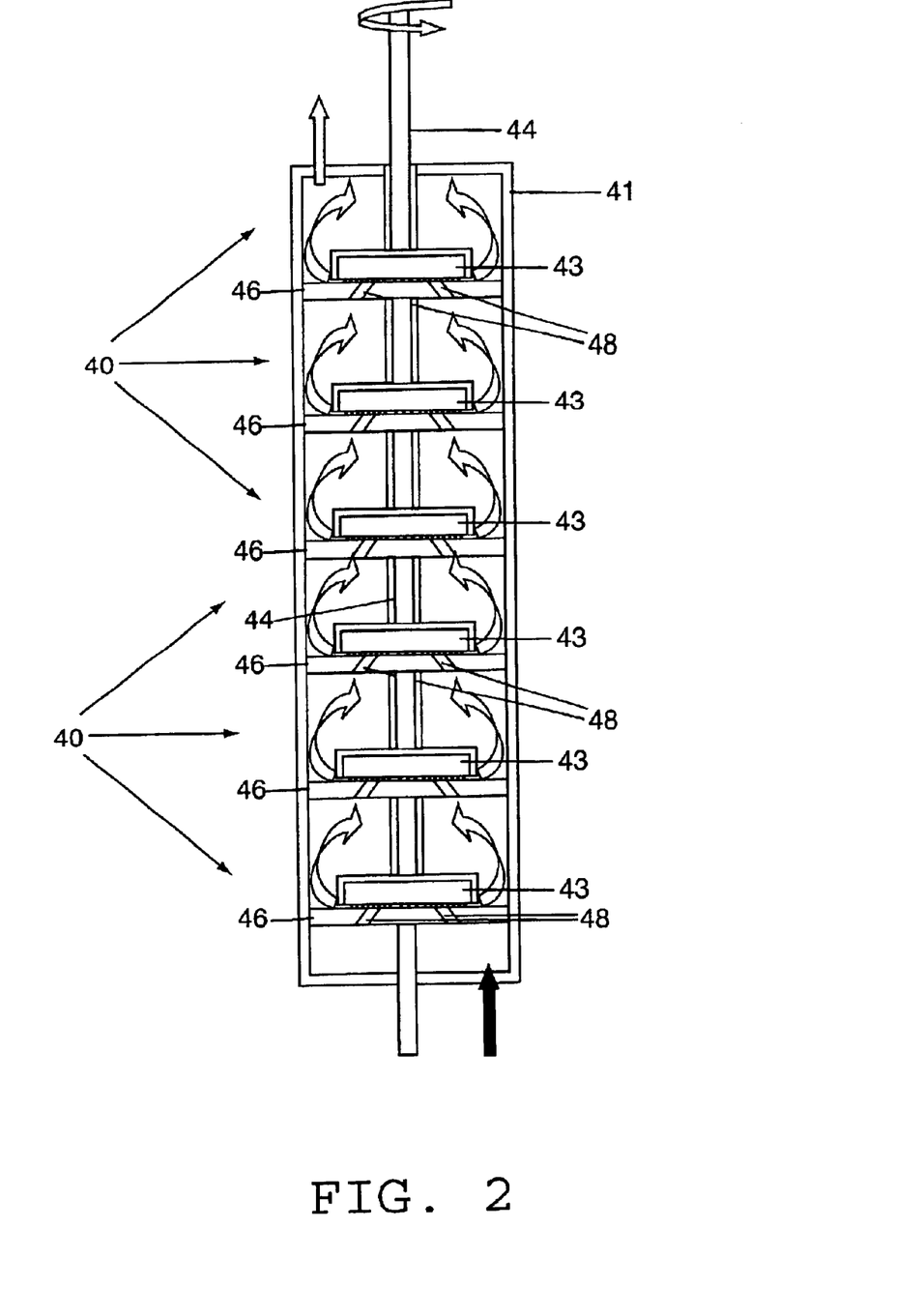
FIG. 2 shows a multistage dense medium plasma reactor suitable for use in the continuous disinfection of a contaminated dense fluid medium.

In FIG. 2, six dense medium plasma reactors 40, each housed with a separate reaction container, are stacked one above the other to form six stages enclosed within an enclosed reaction vessel 41. The rotating electrodes 43 are all attached to a common shaft 44 and therefore rotate at the same speed with respect to stationary electrodes 46 which have openings 48 therein to allow the fluid medium to flow into the space between the upper and lower electrodes. The dense medium is introduced to this multistage reactor through an inlet on the bottom of the reactor. In the process for inactivating microorganisms, the dense medium containing at least one microorganism flows through the conduits 48 in the first stage static electrode 48 into the center area of the planar gap between the first stage static electrode 48 and the first stage rotating electrode 43. The dense medium from the first stage of the plasma reactor exits the first stage and enters the second stage of the reactor through conduits in the second stage static electrode. The conduits in the second stage static electrode also introduce the dense medium to the center of the planar gap between the second stage static electrode and the second stage rotating electrode. This process is repeated for each stage of the multistage reactor. In each of the various stages, reactive species, antimicrobial nanoparticles, or both are produced. The disinfected dense fluid medium, as well as any colloidal dispersion of nanoparticles, may be collected from the final stage of the multistage reactor. Conveniently, such collection is by means of an overflow discharge from the top of the last stage of the multistage reactor.

The following examples are offered by way of illustration and not by way of limitation.

EXAMPLES

Example 1

Inactivation of Spores with Multiple Plasma Discharges

This example describes the results of experiments on microorganism-containing water in a plasma discharge reactor.

Spores for Water Contamination.

Bacterial spore strains used were *Bacillus stearothermophilus* ATCC 7953, a heat resistant spore, and *Bacillus cereus* MGBC 145, a common pathogenic spore. The spores were prepared as follows: 100 $\mu$L of an overnight TSB culture of *B. Cereus* or *B. stearothermophilus* were spread onto the surface of a sporulation agar plate (nutrient agar with 50 mg $MnSO_4$/L). The plates were incubated at 37° C. for up to 5 days and checked daily for sporulation. Five milliliters of cold saline were added to each plate, and the surface was scraped to suspend the spores. The spores were washed by centrifuging and resuspending the pellet in 10 ml of distilled water three times. After the final wash, the spore preparation was frozen at −20° C. Before each experiment, an aliquot of the spore preparation was thawed and heat shocked at 80° C. for 10 minutes to inactivate any vegetative cells.

Procedure for Inactivating Spores.

Spore contaminated water samples (200 ml) were treated in the reactor shown in FIG. 1. The reactor parameters and the results are shown in table 1 for different time intervals. The plasma reactor was pressurized with oxygen ($O_2$) gas in each experiment.

TABLE 1

| # | Sample | Electrode Material | DC voltage (V) | DC current (A) | Time (min) | Plate Counts of Surviving Bacteria (log CFU/ml) | Percent (%) Decrease in Bacteria Counts |
|---|---|---|---|---|---|---|---|
| 1 | Bacillus stearothermophilus ATCC 7953 | Stainless Steel | 200 | 1.5 | 0 (control) | 4.53 | 0 |
|   |   |   |   |   | 3 | 4.02 | 69 |
|   |   |   |   |   | 5 | 3.83 | 80 |
|   |   |   |   |   | 7 | 3.69 | 86 |
|   |   |   |   |   | 10 | 2.97 | 97 |
|   |   |   |   |   | 20 | 2.93 | 98 |
| 2 | Bacillus Stearothermophilus ATCC 7953 | Titanium | 200 | 1.5 | 0 (control) | 4.94 | 0 |
|   |   |   |   |   | 5 | 4.69 | 44 |
|   |   |   |   |   | 7 | 4.69 | 44 |
|   |   |   |   |   | 10 | 4.57 | 57 |
|   |   |   |   |   | 20 | 4.08 | 86 |
|   |   |   |   |   | 30 | 3.34 | 98 |
| 3 | Bacillus Stearothermophilus ATCC 7953 | Silver | 200 | 1.5 | 0 (control) | 4.90 | 0 |
|   |   |   |   |   | 5 | 3.65 | 94 |
|   |   |   |   |   | 7 | 3.69 | 94 |
|   |   |   |   |   | 10 | 4.72 | 34 |
|   |   |   |   |   | 20 | 4.70 | 37 |
|   |   |   |   |   | 30 | 3.55 | 96 |
| 4 | Bacillus cereus MGBC 145 | Stainless Steel | 200 | 1.5 | 0 (control) | 5.25 | 0 |
|   |   |   |   |   | 0.5 | 5.18 | 15 |
|   |   |   |   |   | 1 | 5.14 | 22 |
|   |   |   |   |   | 2 | 5.25 | 0 |
|   |   |   |   |   | 3 | 5.05 | 37 |
|   |   |   |   |   | 5 | 4.96 | 49 |

In all of the spore-contaminated solutions, at least 98% of the spores were inactivated after being exposed to the plasma for 30 minutes. In some cases, the inactivation time was considerably shorter, and for the silver electrodes 94% of the spores were inactivated in just 5 minutes. The enhanced rate of inactivation for the silver electrodes is likely due to the antimicrobial properties of the silver nanoparticles that are produced during the plasma reactions. (The production of silver nanoparticles is discussed in greater detail in Example 2, below.)

Silver electrodes are particularly well suited for spore inactivation. Table 2 shows the results of additional experiments conducted using silver electrodes.

TABLE 2

| # | Sample | Electrode Material | DC voltage (V) | DC current (A) | Time (min) | Plate Counts of Surviving Bacteria (log CFU/ml) | Percent (%) Decrease in Bacteria Counts |
|---|---|---|---|---|---|---|---|
| 1 | Bacillus stearothermophilus ATCC 7953 | Silver | 200 | 1.5 | 0 | 4.79 | 0 |
|   |   |   |   |   | 0.5 | 4.87 | 0 |
|   |   |   |   |   | 1 | 4.64 | 29 |
|   |   |   |   |   | 2 | 4.44 | 55 |
|   |   |   |   |   | 3 | 4.69 | 21 |
|   |   |   |   |   | 5 | 3.59 | 94 |
| 2 | Bacillus stearothermophilus ATCC 7953 | Silver | 200 | 1.5 | 5 | 3.91 | 91 |
| 3 | Bacillus stearothermophilus ATCC 7953 | Silver | 200 | 1.5 | 5 | 4.03 | 88 |

TABLE 2-continued

| # | Sample | Electrode Material | DC voltage (V) | DC current (A) | Time (min) | Plate Counts of Surviving Bacteria (log CFU/ml) | Percent (%) Decrease in Bacteria Counts |
|---|---|---|---|---|---|---|---|
| 4 | Bacillus stearothermophilus ATCC 7953 | First Electrode = Silver; Second Electrode = Titanium | 200 | 1.5 | 5 | 4.56 | 59 |

Example 2

Production of Antimicrobial Silver Nanoparticles

This example describes a method for producing a suspension of bactericidal silver nanoparticles. The suspension and nanoparticles described herein may be added to a liquid containing microorganisms in order to inactivate the microorganisms.

Colloidal dispersions of silver were made in a reactor as shown in FIG. 1. Both electrodes were made of 99.9% pure silver. In a typical "stationary"-experiment 0.5 liter of ACS grade water (available from Aldrich Chemicals) is introduced into the system, then an about 1 mm distance between the electrodes is established, and the rotation of the upper electrodes is initiated and sustained at about 1000 rpm. An argon gas flow rate (0.2 slm) is passed through the liquid medium during the process to degas the water. In the next step, the discharge was started and sustained at the 200 DC voltage, 2.5A electric current and various treatment times between 5 seconds and 5 minutes. The temperature of the dense medium in the reaction system was 15° C. At the end of the reaction the power supply is disconnected from the system and the liquid is removed and stored until analytical work is initiated.

Gravimetric concentration evaluation of the colloidal silver indicates that the silver concentration is about 200 ppm for a 1 minute treatment time.

The colloidal dispersions produced above were evaporated and the nanoparticles analyzed by scanning electron microscopy and energy dispersion spectroscopy. The photomicrographs showed particles with dimensions less than 10 nm.

Example 3

Antimicrobial Activity

The antimicrobial activity of colloidal dispersions of silver as made by the current invention were measured. Bacterial contaminated water solutions were prepared and treated either by processing through the dense media plasma reactor or by adding a solution that was processed through the dense media plasma reactor.

The bacterial contaminated water solutions and the plate counts of surviving bacteria have been carried out at the Food Research Institute-UW according to the following procedure:

Inoculum for Water Contamination.

Four bacterial strains were grown overnight in trypticase soy broth (TSB) at room temperature. The next day they were transferred to TSB (diluted 1:100 in distilled water) and grown overnight at room temperature. The stains were pooled and inoculated into water which was run through a MilliQ system (Millipore Corp., Bedford, Mass.) and sterilized before use.

Bacterial stains used were two *Pseudomonas fluorescens*; a *Salmonella typhimurium* and an *Enterobacter agglomerans*.

Procedure for Testing Survival of Bacteria.

Bacteria-contaminated water solutions were treated under the DMP-plasma conditions for different time intervals (Table 3).

After plasma-treatment, the samples were directly plated or diluted in phosphate buffered saline and then plated on trypticase soy agar. The plated samples were incubated at room temperature for 72 hours. To test for injured bacteria, 0.5 ml of each sample was added to 4.5 ml of TSB and incubated at room temperature. The results are shown in table 3.

TABLE 3

Antimicrobial Activity of Colloidal Silver Dispersion

| # | Sample | DC voltage (V) | DC current (A) | Time (s) | Plate Counts of surviving bacteria (log CFU/ml) | Plate counts of surviving bacteria (CFU/ml) |
|---|---|---|---|---|---|---|
| C.S. 1 | Initial inoculum of water | — | — | — | 5.73 | 537,032 |
| C.S. 2 | Water held until treated samples were plated | — | — | — | 5.41 | 257,040 |

TABLE 3-continued

Antimicrobial Activity of Colloidal Silver Dispersion

| # | Sample | DC voltage (V) | DC current (A) | Time (s) | Plate Counts of surviving bacteria (log CFU/ml) | Plate counts of surviving bacteria (CFU/ml) |
|---|---|---|---|---|---|---|
| Ex. A | Bacteria samples treated for 5 s | 200 | 0.4 | 5 | <1.0 | 0. |
| Ex. B | Bacteria sample treated for 10 s | 200 | 0.4 | 10 | <1.0 | 0. |
| Ex. C | Bacterial sample treated for 1 min | 200 | 0.4 | 60 | <1.0 | 0. |
| Ex. D | Water ACS treated and added 1:1 to bacteria sample | 200 | 0.4 | 60 | <1.0 | 0. |
| Ex. E | 1 ml of bacteria sample treated for 10 s added to 200 ml untreated bacteria sample | — | — | — | 3.69 | 4,898 |

In all solutions resulting from the plasma-treatments the bacteria were killed completely. Even solutions prepared from 200 ml of solution containing the inoculum and 1 ml of the plasma-treated bacterial sample that was treated in the plasma reactor for 10 seconds, exhibited a 99% reduction of the living bacterial content. The only samples that were positive for growth upon enrichment were the untreated water and untreated water with 1 ml of 10 seconds treated bacterial sample.

Treatment of the samples, even for 5 seconds, killed the bacterial inoculum. No bacteria were recovered either by direct plate count or by enrichment. Addition of the 10 second treated bacterial solution to the untreated inoculated water efficiently reduced the bacterial count by 99%

This high efficiency of colloidal silver and silver oxide production, and the extremely strong bactericide character of the plasma-generated solutions, allow the development of technologies in a continuous-flow-system mode, and the generation of silver-based solutions in high volume liquid media. Such solutions may also be used to kill or control other micro-organic matter such as viruses and spores.

Examples of technologies that are enabled by the inventive method include industrial cooling water applications, air conditioning (especially swamp coolers), and swimming pools. Industrial cooling water, in particular cooling water used in the food processing industry, may contain harmful microbes which could contaminate the food. Likewise, air conditioners and swamp coolers, have been linked to various diseases such as Legionnaires' disease. The results shown in the microbial example indicate that a colloidal dispersion produced by 10 seconds treatment in the dense medium plasma reactor is effective in killing bacteria even after a 200:1 dilution. Therefore, the reactor described above, which processes one-half liter of water into a colloidal dispersion of silver in 10 seconds would, in continuous flow operation, provide 180 liter/hr of colloidal silver which at a 200:1 dilution could sterilize 36,000 liter/hr of contaminated water. This processing rate can easily be increased by building larger dense media plasma reactors or by building multistage plasma reactors.

It is understood that the invention is not confined to the particular embodiments described herein, but embraces all such forms thereof as come within the scope of the following claims.

What is claimed is:

1. A method of disinfecting a dense fluid medium containing at least one microorganism, the method comprising:
    (a) providing a reaction vessel for containing a dense fluid medium, the dense fluid medium containing at least one microorganism;
    (b) charging the dense fluid medium into the reaction vessel;
    (c) providing a first electrode comprising a first conductive material, the first electrode immersed within the dense fluid medium;
    (d) providing a second electrode comprising a second conductive material, the second electrode immersed within the dense fluid medium and disposed opposite the first electrode;
    (e) stirring the dense fluid medium between the first and second electrodes;
    (f) applying an electric potential between the first electrode and the second electrode to create a discharge zone comprising a plurality of discharges wherein the electric potential is high enough to produce reactive species in the dense fluid medium; and
    (g) exposing the microorganisms in the dense liquid medium to the reactive species in the dense fluid medium for a time sufficient to at least partially inactivate the microorganisms.

2. The method of claim 1 wherein the reactive species are selected from the group consisting of electrons, ions, free radicals, and mixtures thereof.

3. The method of claim 1 wherein the microorganism is a bacteria.

4. The method of claim 1 wherein the bacteria is a spore.

5. The method of claim 1 wherein the first electrode is a rotating electrode and the second electrode is a stationary electrode.

6. The method of claim 1 wherein the second electrode is hollow and includes at least one conduit for passage of the dense fluid medium.

7. The method of claim 5 wherein the first electrode rotates at a rate sufficient to cause cavitation in the dense fluid medium.

8. The method of claim 5 wherein the first electrode rotates at a speed of up to about 5000 RPM.

9. The method of claim 5 wherein the first electrode rotates at a speed of at least about 1000 RPM.

10. The method of claim 1 wherein at least one of the first conductive material or the second conductive material comprises an electrical conductor selected from the group consisting of metals, carbon or combinations thereof.

11. The method of claim 1 wherein at least one of the first conductive material or the second conductive material comprises an electrical conductor selected from the group consisting of aluminum, antimony, bismuth, carbon, copper, gold, iron, lead, molybdenum, nickel, platinum, silver, tin, tungsten, zinc, stainless steel, rare earths or combinations thereof.

12. The method of claim 1 wherein at least one of the first conductive material or the second conductive material comprises titanium.

13. The method of claim 1 wherein at least one of the first conductive material or the second conductive material comprises iron.

14. The method of claim 1 wherein at least one of the first conductive material or the second conductive material comprises stainless steel.

15. The method of claim 1 including the step of passing a gas through the discharge zone.

16. The method of claim 1 wherein the first electrode and the second electrode each comprise at least one planar surface, wherein the planar surface of the first electrode is substantially parallel to the planar surface of the second electrode.

17. The method of claim 16 wherein the substantially planar parallel surfaces are separated by a gap of about 1 mm.

18. The method of claim 16 wherein the first electrode comprises at least one pin made of the first conducting material, the pin projecting from the planar surface of the first electrode towards the planar surface of the second electrode.

19. The method of claim 16 wherein the first electrode comprises multiple pins made of the first conducting material, the pins projecting from the planar surface of the first electrode towards the planar surface of the second electrode.

20. The method of claim 19 wherein the pins are arrayed in a spiral pattern.

21. The method of claim 1 wherein the electric potential is between 100 and 800 volts.

22. The method of claim 1 wherein the electric potential is between 100 and 250 volts.

23. The method of claim 1 wherein the electric potential is about 200 volts.

24. The method of claim 1 wherein at least one of the first conductive material or the second conductive material comprise a material having antimicrobial properties and further wherein the electric potential between the first electrode and the second electrode is sufficient to dislocate antimicrobial nanoparticles from the electrode comprising the material having antimicrobial properties.

25. The method of claim 24 wherein the material having antimicrobial properties is silver.

26. The method of claim 1 further including mixing a colloidal suspension of antimicrobial nanoparticles with the dense fluid medium.

27. A method of disinfecting a dense fluid medium containing at least one microorganism, the method comprising:

(a) providing a first reaction container for containing a dense fluid medium, the dense fluid medium containing at least one microorganism;

(b) charging the dense fluid medium into the first reaction container;

(c) providing a first electrode comprising a first conductive material, the first electrode immersed within the dense fluid medium and housed in the first reaction container;

(d) providing a second electrode comprising a second conductive material, the second electrode immersed within the dense fluid medium and disposed opposite the first electrode in the first reaction container;

(e) applying an electric potential between the first electrode and the second electrode to create a discharge zone comprising a plurality of discharges wherein the electric potential is high enough to produce reactive species in the dense fluid medium;

(f) providing a second reaction container for containing a dense fluid medium, the second reaction container connected to and in fluid communication with the first reaction container through an inlet port;

(g) changing the dense fluid medium between the first reaction container and the second reaction container;

(h) providing a third electrode comprising a third conductive material, the third electrode immersed within the dense fluid medium and housed within the second reaction container;

(i) providing a fourth electrode comprising a fourth conductive material, the fourth electrode immersed within the dense fluid medium and disposed opposite the third electrode in the second reaction container;

wherein at least one of the third conductive material or the fourth conductive material comprises a material having antimicrobial properties and, further, wherein the electric potential between the third electrode and the fourth electrode is high enough to dislocate antimicrobial nanoparticles from the at least one conductive material having antimicrobial properties.

* * * * *